J. WILLNERS.
SHOCK ABSORBER.
APPLICATION FILED JUNE 5, 1915.
1,161,431.
Patented Nov. 23, 1915.
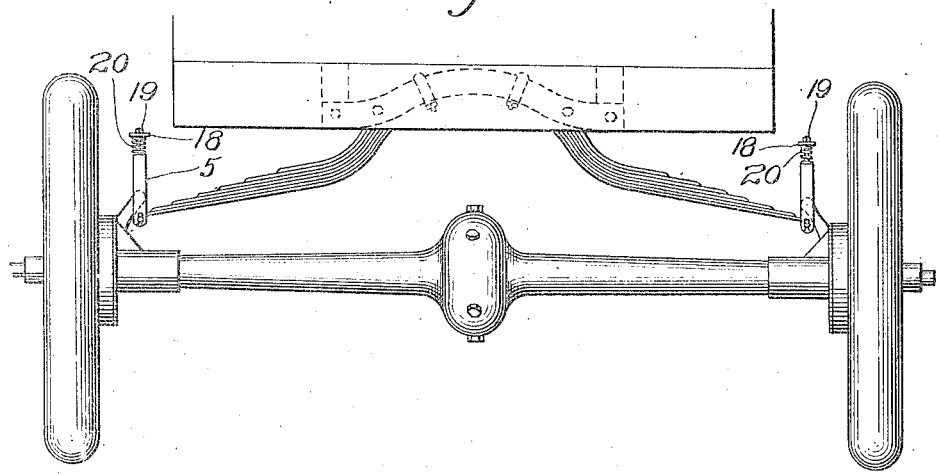
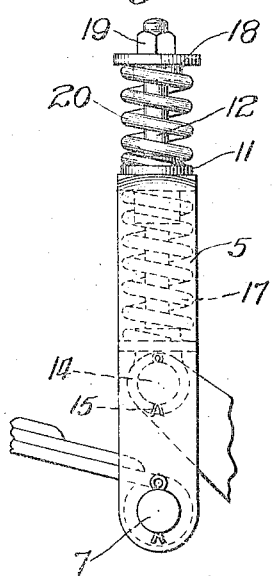
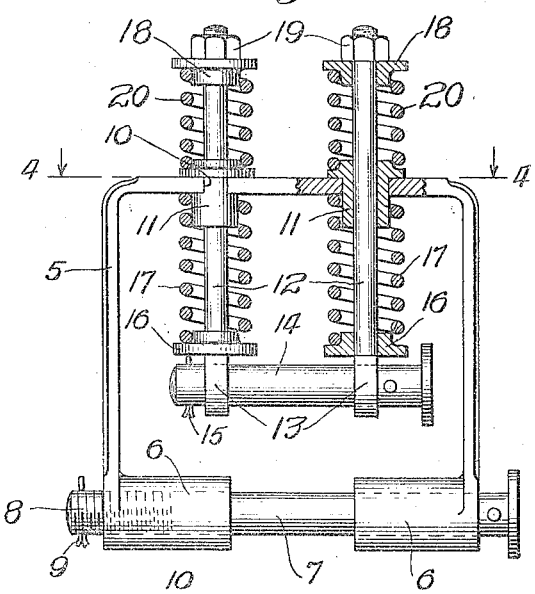
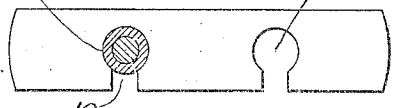
Witness:
G. C. Higham.
Inventor
John Willners
by Fleming & Fleming
Attys.

UNITED STATES PATENT OFFICE.

JOHN WILLNERS, OF CHICAGO HEIGHTS, ILLINOIS, ASSIGNOR TO WILLNERS-HOITOMT SPECIALTY CO., OF CHICAGO HEIGHTS, ILLINOIS, A CORPORATION OF ILLINOIS.

SHOCK-ABSORBER.

1,161,431.     Specification of Letters Patent.     Patented Nov. 23, 1915.

Application filed June 5, 1915. Serial No. 32,275.

*To all whom it may concern:*

Be it known that I, JOHN WILLNERS, a citizen of the United States, residing at Chicago Heights, in the county of Cook and State of Illinois, have invented certain new and useful Improvements in Shock-Absorbers, of which the following is a specification.

This invention relates to a device such as is commonly used with vehicles, for absorbing shocks, etc., arising from travel over an uneven road.

It is the object of my invention, among other things, to construct a shock absorber which is compact, simple, and inexpensive, having the parts thereof so arranged as to enable ready attachment to or detachment from the vehicle whenever necessary.

My invention is concerned also with numerous other features of construction and combinations of parts, as will more fully hereinafter appear.

In the drawing: Figure 1 is an end view of an automobile, showing the manner and location in which the present shock absorber is mounted; Fig. 2 is an elevation of the shock absorber, partly in section, taken at right angles to the position shown in Fig. 1; Fig. 3 is an end elevation of the shock absorber; and Fig. 4 is a section through the shock absorber, on line 4—4 of Fig. 2, one of the pins being removed from position.

The device of my invention comprises a frame 5 of a generally inverted U-shaped construction. The arms of the frame, at their ends, are shaped to provide bearings 6, within which a pin 7 is mounted, and secured therein by any suitable means, such as screw threads 8, or a cotter pin 9, or both, as shown in Fig. 2. The connecting side of the U-shaped frame is formed with one or more key-hole slots 10, as appears clearly in Fig. 4. Within the enlarged portion of each of such slots is mounted a bushing 11, through which a pin 12 is projected. Each of the pins 12 is formed with an eye 13 at its lower end, to provide a bearing for a cross pin 14, which may be secured in place by any suitable means, such as the cotter pin 15 illustrated in Fig. 2.

A flanged collar 16 rests against the eye end of each of the pins 12, and affords a seat for the lower end of a coiled spring 17, the upper end of the spring being engaged against the inner face of the connecting arm of the frame. Near the upper end of each of the pins 12 another flanged collar 18 is situated, being secured in place by a nut 19, this flanged collar 18, together with the bushing 11, constituting end abutments for a coiled spring 20.

Obviously the pins 12 are capable of movement in either direction against the tension of the springs 17 and 20, thereby cushioning shocks and rebounds which would otherwise be transmitted to the body of the vehicle. The shock absorber is mounted in the usual manner, the pin 7 being secured to the vehicle body as through one end of the leaf spring, and the pin 14 being secured to a bearing or support connected with the chassis or axle of the car. When, as frequently happens, repairs require that the device be temporarily disconnected from the vehicle, it is necessary only that the nuts 19 be removed and the springs 20 taken off to enable the bushings 11 to be moved out of the key-hole slots, whereupon the pins 12 can pass laterally out of the frame. The pin 7 may be removed at once by removing the cotter pin 9, or by an unthreading action, as necessary.

In replacing the device in position, no alining or registering of parts is necessary, such as is commonly the case, and on this account attachment may be made without loss of time.

I claim:

1. In a shock absorber, the combination with a fixed element having a key-hole slot extended to one side thereof, and a bushing mounted within the enlarged portion of the slot, of a second element movable with respect to the fixed element, said movable element embodying a pin longitudinally movable within the bushing and withdrawable laterally from said key-hole slot after removal of the bushing therefrom, substantially as described.

2. In a shock absorber, the combination with a fixed element having a slot extended to one side thereof, and a bushing mounted within the slot, of a second element movable with respect to the fixed element, said movable element comprising a pin within the bushing movable only longitudinally therewithin, and means for preventing lateral movement of the bushing within the slot, said means not preventing lateral movement of the pin within the slot when the bushing is removed therefrom, substantially as described.

3. In a shock absorber, the combination with a fixed element and a bushing mounted thereon, of a pin secured within the bushing and movable therein in a longitudinal direction only, means for normally maintaining said pin in a definite longitudinal position relative to the bushing, and means for enabling removal of said pin from the fixed element by a relative lateral movement, substantially as described.

JOHN WILLNERS.

Witnesses:
EPHRAIM BANNING,
JOHN A. BODE.